UNITED STATES PATENT OFFICE 2,106,938

FIREPROOFING OF WOOD

Heinrich Tramm, Carl Clar, Paul Kühnel, and Walter Schuff, Oberhausen-Holten, Germany, assignors to Ruhrchemie Aktiengesellschaft, Oberhausen-Holten, Germany No Drawing. Application June 21, 1935, Serial No. 27,744. In Germany July 10, 1934

5 Claims. (Cl. 134—78.6)

Our invention relates to the fire-proofing of wood and other materials and more especially to a fire-proofing composition enabling readily combustible materials and more especially wood to be protected against inflammation and burning. The invention also relates to the process of producing such compositions.

In our copending application for patent of the United States, Serial No. 19,300 filed May 1, 1935, we have described fireproofing compositions containing sugar as main constituent and a condensation product of dicyandiamide and an aldehyde.

We have now found that an excellent fireproofing effect can be obtained also with a mass free from sugar, which solely consists of or contains a condensation product of dicyandiamide and an aldehyde, such as formaldehyde. We have found that the product obtained by acting on the dicyandiamide, obtainable for instance by lixiviation, at a slightly elevated temperature, of calciumcyanamide with water, with formaldehyde or a substance, from which formaldehyde is split off, such as a polyoxymethylene, in the presence of an ammonium salt, forms an excellent fire-proofing composition. Since the dicyandiamide reacts only very slowly with formaldehyde, an ammonium salt is added to accelerate the condensation reaction.

In the production of a composition of this kind we may for instance proceed as follows:

Example 1

84 parts by weight dicyandiamide are entered in 243 parts of a formaldehyde solution of 37% to which are added 66 parts $(NH_4)_2HPO_4$. In consequence of the presence of the diammonium phosphate the mixture, which otherwise would react only very slowly, when spread on wood, soon solidifies, forming a glass-like coating which, when acted upon by a flame, will swell and form a swollen layer of carbon, which effectively protects the wood against inflammation.

If a wooden plate covered with a mass produced according to this invention is held in the blue part of the flame of a Bunsen burner, the mass will swell and form a layer of carbon. On this layer being removed and the plate once more acted upon by the flame, a fresh layer of carbon will form and nevertheless no inflammation of the wood will take place.

Example 2

The diammonium phosphate of Example 1 may be replaced with an equal effect by 115 parts $NH_4H_2PO_4$ or by 66 parts $(NH_4)_2SO_4$ or 54 parts $NH_4Cl$ or 98 parts $NH_4Br$.

We have found ammoniumthiocyanate to exert a particularly vigorous accelerating action on the polymerization going on in the mass.

In order to further accelerate the condensation reaction we may also add other accelerators such as free acids.

Example 3

18 parts dicyandiamide are mixed with 57 parts formaldehyde solution of 22.5% and 25 parts $NH_4H_2PO_4$. Preferably the formaldehyde solution is first heated to 50 to 60° C. and the dicyandiamide introduced under stirring, whereupon the monoammoniumphosphate is added. The exothermic reaction causes the temperature of the solution to rise to 80 to 90° C.

The products of reaction are distinguished by their high stability and can be stored for a long time without solidifying.

We have found the proportion of 1 mol. dicyandiamide to about 2 mols formaldehyde and about 1 mol. ammonia to be particularly favorable.

Example 4

To the solution of the resinous compound obtained according to Example 3 an inorganic pigment such as for instance lithopone or ocher is added, an addition of up to 30% of such pigment being satisfactory.

In order however to cheapen the manufacture of mixtures of the condensation product and a pigment or dyestuff, we may add the resinous compound to a lacquer solution under the form of a solution or of a finely distributed (ground) powder. We have for instance found an addition of about 20% of powdered dicyandiamide resin to about 80% of a nitrocellulose lacquer to give satisfactory results. We have further found that we may first of all coat the wood to be protected with the resinous mass and, after this coating has dried down, cover it with a suitable lacquer, for instance a nitrocellulose lacquer or an enamel lacquer.

Instead of merely coating the surface of the wood with a resinous mass, we may also impregnate wood with a solution of the reactants, which are then allowed to react with each other in the wood, which is thus impregnated with the fireproofing resin throughout. Impregnated wood treated in this manner may then be coated with a lacquer or paint.

Apart from the inorganic pigments mentioned above, we may also incorporate in the fireproofing composition other fillers including for instance colcothar, aluminium hydroxide and the like.

We may also add organic dyestuffs.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim in the present application to any modification not covered by these claims is expressly reserved.

We claim:—

1. The process of producing a resinous fireproofing composition, which comprises acting on 1 mol. dicyandiamide with about two mols formaldehyde in the presence of about 1 mol. ammonia under the form of an ammonium salt.

2. The process of producing a resinous fireproofing composition, which comprises reacting dicyandiamide with formaldehyde in the presence of an ammonium salt substantially in the proportion 1: 1: 0.8.

3. The process of producing a resinous fireproofing composition, which comprises causing dicyandiamide to react with formaldehyde in the presence of an ammonium phosphate.

4. The process of producing a resinous fireproofing composition, which comprises reacting dicyandiamide with formaldehyde in the presence of an ammonium salt in the proportion of about 1: 0.7: 1.4.

5. The process of producing a resinous fireproofing composition, which comprises reacting dicyandiamide with formaldehyde in the presence of an ammonium salt at about 80–100° C. in the proportion of about 1: 0.7: 1.4.

HEINRICH TRAMM.
CARL CLAR.
PAUL KÜHNEL.
WALTER SCHUFF.